(12) United States Patent
Leblanc

(10) Patent No.: US 7,380,406 B2
(45) Date of Patent: Jun. 3, 2008

(54) REFRIGERATED WATER PUMPING SYSTEM

(76) Inventor: Yanick Leblanc, 303, St-Amable, St-Barnabé Sud, Quebec (CA) J0H 1G0

( * ) Notice: Subject to any disclaimer, the term of this patent is extended or adjusted under 35 U.S.C. 154(b) by 318 days.

(21) Appl. No.: 11/234,087

(22) Filed: Sep. 26, 2005

(65) Prior Publication Data
US 2007/0068186 A1 Mar. 29, 2007

(51) Int. Cl.
*F28D 5/00* (2006.01)
(52) U.S. Cl. .................................. 62/176.6; 62/311
(58) Field of Classification Search .............. 62/176.6, 62/304, 311, 310; 261/140.1
See application file for complete search history.

(56) References Cited

U.S. PATENT DOCUMENTS

| 1,837,798 A * | 12/1931 | Shipley ..................... 62/173 |
| 3,169,575 A * | 2/1965 | Engalitcheff, Jr. et al. ...... 62/99 |
| 3,861,164 A * | 1/1975 | Brown ........................ 62/91 |
| 4,773,471 A | 9/1988 | Grant et al. |
| 4,930,446 A | 6/1990 | Huisinga |
| 5,692,386 A | 12/1997 | Casey, Sr. |
| 5,884,492 A * | 3/1999 | Zwicky et al. ............... 62/91 |
| 6,367,278 B1 | 4/2002 | Strussion et al. |
| 6,675,739 B2 | 1/2004 | Terrell et al. |
| 6,966,364 B1* | 11/2005 | Babikian et al. ............ 165/228 |

* cited by examiner

*Primary Examiner*—William E. Tapolcai
(74) *Attorney, Agent, or Firm*—Equinox Protection; Franz Bonsang

(57) ABSTRACT

A refrigerated water pumping system provides high-pressure refrigerated water to misting nozzles situated in a livestock enclosure for housing livestock and adapted for converting the high-pressure refrigerated water into a fine mist or fog of water droplets at a target water temperature for evaporation in the enclosure to provide cooling of the enclosure to a target enclosure temperature. The system comprises a pump and a post-pumping heat exchanger, with the water being pumped by pump into high-pressure water. The high-pressure water is subsequently refrigerated into high-pressure refrigerated water having the target temperature by absorption of a target heat from the water by a refrigerant in the post-pumping heat exchanger, including any heat absorbed by water during pumping in pump.

18 Claims, 3 Drawing Sheets

REFRIGERATED WATER PUMPING SYSTEM

FIELD OF THE INVENTION

Figure 1:
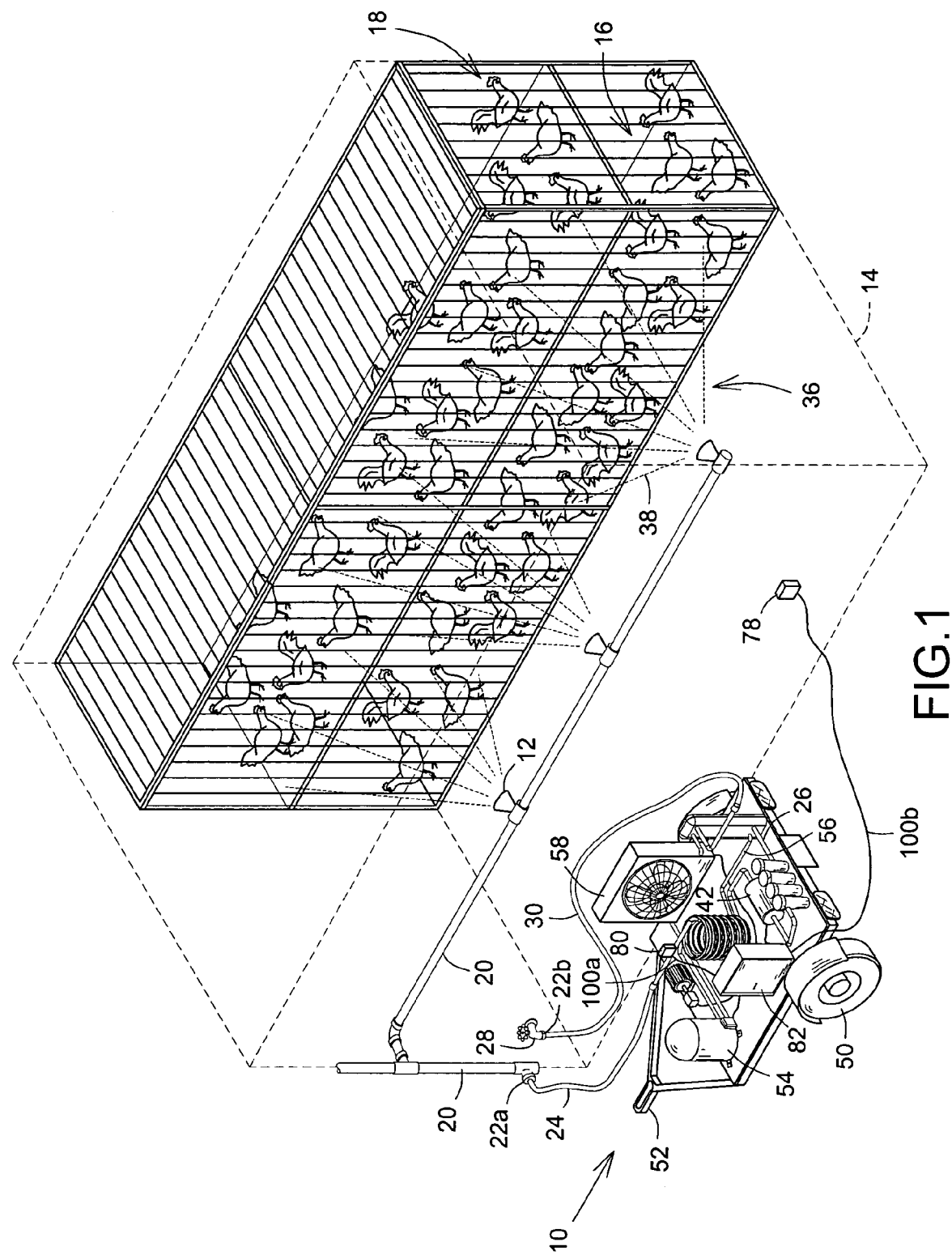

The present invention relates to refrigerated water pumping systems, and more particularly, refrigerated water pumping systems for cooling an enclosure housing livestock.

BACKGROUND OF THE INVENTION

The importance of temperature control is well established for interior enclosures in which livestock, including poultry such as chickens, are housed, i.e. livestock enclosures or environments. Excessive or insufficient enclosure temperature can result in animals with physiological stress, which can cause illness. For example, chickens may often become ill if the enclosure temperature of the enclosure in which they are housed declines below 79 degrees Fahrenheit (79° F.) or may begin to suffocate if the enclosure temperature rises above 89° F. Further, such conditions may also detrimentally affect animal growth and, for chickens, production of eggs. Obviously, slower rates of growth and such lowered production increase the costs to the producer thus lowering profit.

To address this concern, modern livestock enclosures generally include some sort of air cooling mechanism to regulate enclosure temperature of the livestock enclosures, during periods of the year when cooling is required, to a target enclosure temperature range within which the enclosure temperature of the enclosure may safely vary for safely housing livestock. For example, for chickens, the target enclosure temperature range is generally, as suggested above, between 79° F. and 89° F. However, cooling livestock enclosures poses particular challenges in that such enclosures must typically be well-ventilated with high levels of air circulation from the outside to ensure that noxious gases arising from the presence of livestock excrement and litter can be dissipated. These ventilation requirements typically make use of blown-air air conditioners impractical, since the large volume of air that must be constantly circulated, and cooled, would require excessive amounts of cooling, and, accordingly make use of such systems highly expensive.

One solution used to address these cooling problems for livestock enclosures is the use of evaporative cooling systems and methods. This is particularly the case in the poultry/chicken industry. In evaporative cooling systems, water is pumped by a water pumping system into the livestock enclosures where the water is converted by a misting nozzle into a fine mist, i.e. a fog, of water droplets and distributed thereby or with the aid of ventilation fans into the livestock enclosures. The air in the livestock enclosures absorbs the mist and gives up energy to the water molecules of the water droplets in the mist. This absorption process converts the water droplets into vapor and reduces the temperature of the air in the livestock enclosure, and thereby of the livestock enclosures itself. Such evaporative systems do not require constant blowing of air-conditioned air into the livestock enclosures and thus are often more economical than blown-air cooling systems.

U.S. Pat. No. 4,773,471, issued to Grant et al. on Sep. 27, 1988, teaches such an evaporative cooling system. The system includes a water pumping system having a pump for pumping water to a misting arrangement, namely misting nozzles, for converting the water to the mist and a fan for blowing the mist into the building. However, while the evaporation of the water droplets does cool the livestock enclosures, the amount of cooling possible is limited by water temperature of the water received at the misting nozzles. Specifically, if water provided by the pump to the misting nozzles is not sufficiently cool, there may insufficient cooling of the livestock enclosures by evaporation of water droplets to cool the livestock enclosure to a target enclosure temperature within the target enclosure temperature range, such as, for chickens, a target enclosure temperature between 79° F. and 89° F. Accordingly, the temperature of the water received by the misting nozzles from the pump is of primary importance. In general, evaporative cooling systems having pumping systems which provide pumped high-pressure water to misting nozzles at a room temperature of 65° F. can only cool a livestock enclosure to a temperature of 89° F. Obviously, as 89° F. is at the extreme high end of the target enclosure temperature range for chickens, water pumped to misting nozzles must be received thereby at a water temperature below 65° F. if an evaporative system is to be useful for certain types of livestock, such as chickens. Specifically, to ensure sufficient cooling during hot days, water temperature of the water received at the misting nozzle water must generally be at a target water temperature below 40° F. to sufficiently lower the enclosure temperature to a target enclosure temperature within an enclosure temperature range of 79° F. to 89° F. Accordingly, an evaporative cooling system such as that taught by U.S. Pat. No. 4,773,471 may be insufficient for cooling a livestock enclosure during hot days of the year or in very warm climates.

U.S. Pat. No. 6,367,278, issued to Strussion et al. on Apr. 9, 2002, discloses an evaporative cooling system having a refrigerated water pumping system which includes a pump for pumping the water to high pressure and a water cooler, such as a heat exchanger, which refrigerates the water prior to pumping to the nozzles. Thus, the water may be refrigerated to an appropriate target water temperature prior to pumping to increase the amount of heat absorbed by water droplets from the livestock enclosure during evaporation and thus increasing cooling of the enclosure. However, while a water cooler in an evaporative cooling system as described in U.S. Pat. No. 6,367,278 could be adapted to reduce the water temperature of water prior to pumping to below 40° F., generally required for chickens and some other types of livestock, this would not prevent the water from absorbing heat during pumping by pump to mist nozzle. Accordingly, pumped water may still arrive, despite cooling before pumping, at mist nozzle having a water temperature in excess of the target water temperature, generally below 40° F. when livestock is chicken, required for cooling the livestock enclosures. It may be possible to cool water to an even lower water temperature than the target water temperature for water at misting nozzles to compensate for heat absorption by water during pumping. However, for certain livestock, such as chickens, where the target water temperature, i.e. below 40° F. for chickens, is close to the freezing point of water of 32° F., additional cooling of water below the target temperature prior to pumping incurs a risk that water may freeze, possibly damaging the pump or other components of the refrigerated water pumping system and the evaporative cooling system.

In addition, the amount of heat absorbed by water during pumping may vary based on environmental conditions in the enclosure such as air pressure and outside temperature, as well as the amount of water pressure required by misting nozzles to convert water into mist and the amount of mist required to cool the livestock enclosure.

Accordingly, there is a need for an improved refrigerated water pumping system capable of furnishing pumped high-pressure refrigerated water at a target water temperature to misting nozzles situated in a livestock enclosure for distributing the high-pressure refrigerated water as a mist for evaporation in the livestock enclosure to provide cooling thereof.

SUMMARY OF THE INVENTION

It is therefore a general object of the present invention to provide an improved refrigerated water pumping system for providing high-pressure refrigerated water for evaporative cooling of an enclosure for housing livestock.

An advantage of the present invention is that the refrigerated water pumping system provides absorption of heat absorbed by water during pumping thereof.

Another advantage of the present invention is that the refrigerated water pumping system is movable.

In a first aspect, the present invention provides a refrigerated water pumping system for pumping water from a water source through a water transport line of the system operatively connected to the water source to at least one misting nozzle disposed within an enclosure. The system comprises:

- a compressor for compressing a refrigerant received from a refrigerant line connected thereto;
- a condenser operatively connected to the compressor by the refrigerant line for condensing the refrigerant after the compressing;
- a pump disposed on the water transport line for pumping the water at high water pressure therethrough, thereby converting the water into a high-pressure water;
- a post-pumping heat exchanger operatively connected to the water transport line between the pump and the misting nozzle and to the refrigerant line between the condenser and the compressor for receiving the refrigerant from the condenser, the refrigerant absorbing heat from the high-pressure water in the post-pumping heat exchanger for refrigerating the high-pressure water into a high-pressure refrigerated water; and
- a pre-pumping heat exchanger operatively connected to the water transport line between the water source and the pump and to the refrigerant line between the condenser and the post-pumping heat exchanger, wherein the refrigerant is compressed in the compressor into a high-pressure refrigerant vapor and the condenser condenses the refrigerant from the high-pressure refrigerant vapor into a high pressure refrigerant liquid, the pre-pumping heat exchanger receives the water from the water source and the high pressure refrigerant liquid from the condenser for refrigerating the water into partially refrigerated water by absorption of heat therein by the high-pressure refrigerant liquid, thereby at least partially evaporating the high-pressure refrigerant liquid into intermediate-pressure refrigerant vapor for circulation in the refrigerant line to the post-pumping heat exchanger from, the partially refrigerated water being pumped by the pump into high-pressure refrigerated water to the post-pumping heat exchanger for refrigeration therein into the high-pressure refrigerated water by absortion of heat by the Intermediate-pressure refrigerant vapor.

In a second aspect, the present invention provides A method for pumping water into high-pressure refrigerated water for a misting nozzle disposed within an enclosure through a water transport line operatively connected to a water source containing water and the misting nozzle using a pump disposed on the water transport line therebetween to pump the water into high-pressure water and a refrigerant compressed by a compressor and subsequently condensed by a condenser, the method comprising the step of:

a) refrigerating the high-pressure water from the pump into the high-pressure refrigerated water in a post-pumping heat exchanger to the water transport line between the pump and the misting nozzle and to a refrigerant line having a refrigerant flowing therethrough, the refrigerant absorbing heat from the high-pressure water in the post-pumping heat exchanger to provide the high-pressure refrigerated water.

Other objects and advantages of the present invention will become apparent from a careful reading of the detailed description provided herein, with appropriate reference to the accompanying drawings.

BRIEF DESCRIPTION OF THE DRAWINGS

For a better understanding of the present invention reference will now be made, by way of example, to the accompanying drawings which aid in understanding a number of embodiments of the present invention and in which:

FIG. 1 is perspective view showing a refrigerated water pumping system in accordance with an embodiment of the invention connected to a livestock enclosure to provide cooling of the livestock enclosure;

FIG. 2 is an expanded perspective view of the refrigerated water pumping system shown in FIG. 1; and FIG. 3 is a schematic view of the refrigerated water pumping system shown in FIG. 1.

DETAILED DESCRIPTION OF THE PREFERRED EMBODIMENT

Reference is now made to FIG. 1, a schematic diagram of a dual refrigerant heat reclaim refrigeration system, shown generally as 100, having a primary evaporator and a secondary evaporator, in accordance with an embodiment of the present invention. Broadly speaking, system 100 includes compressors 112, an indoor glycol-cooled condenser 222 as a refrigerant condenser, a primary evaporator 10 for evaporating a primary refrigerant compressed by compressors 112 and received from a primary refrigerant receiver 118, a plurality of secondary refrigerant evaporators 20 for refrigerating material in proximity thereto during refrigeration cycles using a secondary refrigerant cooled in the primary evaporator 10, a primary refrigerant expansion valve 122, and a heat reclaim means for reclaiming primary latent heat in the primary refrigerant generated and rejected by system 100. Secondary refrigerant may also be heated into a heated defrost state for defrosting a frosted secondary evaporator 20 during a defrost cycle.

Referring now to FIG. 1, therein is shown a refrigerated water pumping system, shown generally as 10, in accordance with an embodiment of the invention operatively connected to misting nozzles 12 disposed in a livestock enclosure 14 housing livestock, shown generally as 16. Misting nozzles 12 are generally spaced five feet apart from each other in manifold 20 in livestock enclosure 14 and are connected via by releasable water line connector **22*a* on manifold 20 to water output line 24, which is connected to water transport line 26 of system 10. Water source 28, from which water is supplied to system 10, is connected on releasable water line connector 22*b* to water input line 30, which is also connected to water transport line 26 of system 10. Water from water source 30 is carried through system 10 in water transport line 26 to misting nozzles 12. Thus, when system 10 is in operation, water source 28 and water misting nozzles 12 are releasably operatively connected to each other by water transport line 26 and system 10 is releasably operatively connected to water source 28 and misting nozzles 12** when in operation.

Figure 2:
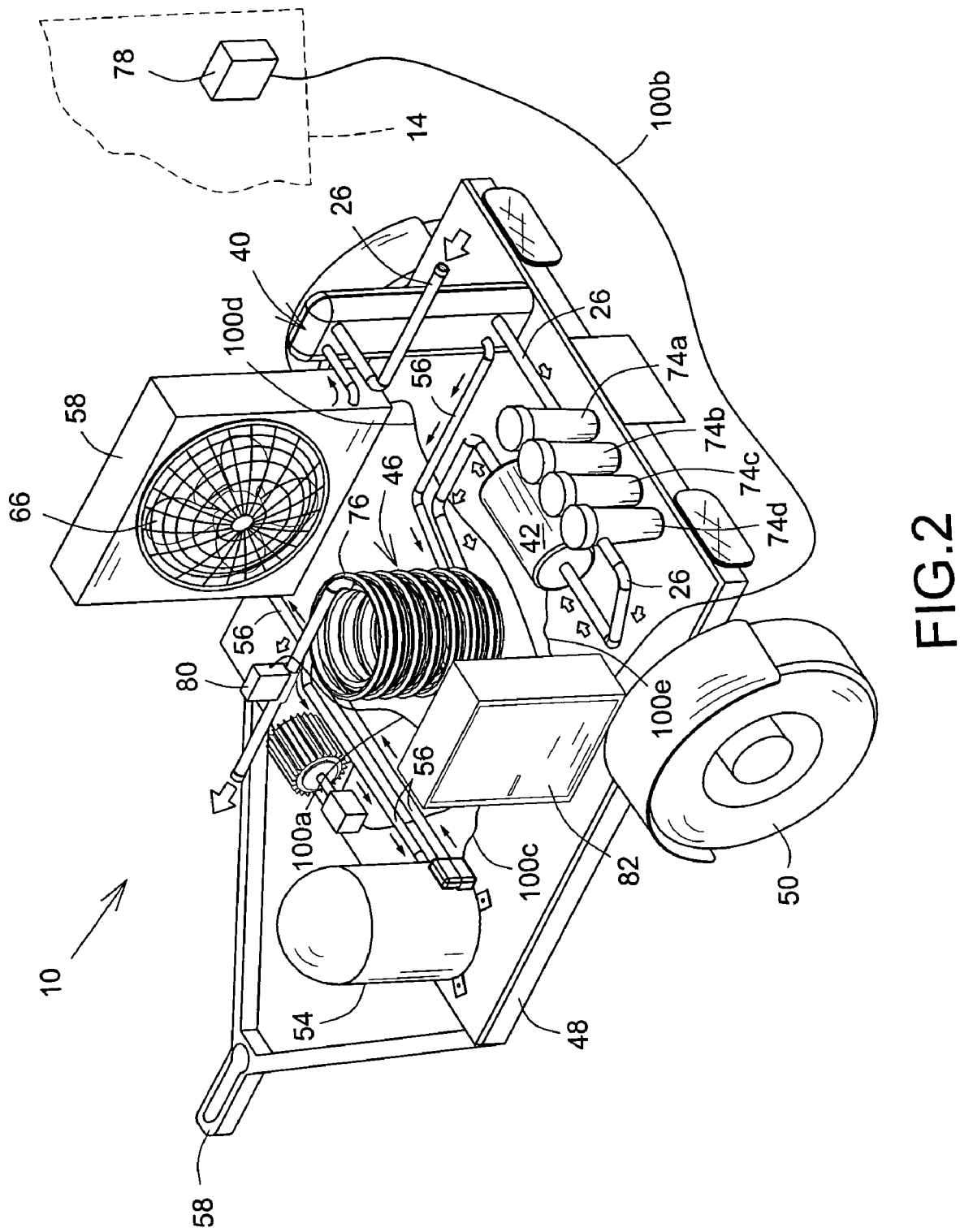
Figure 3:
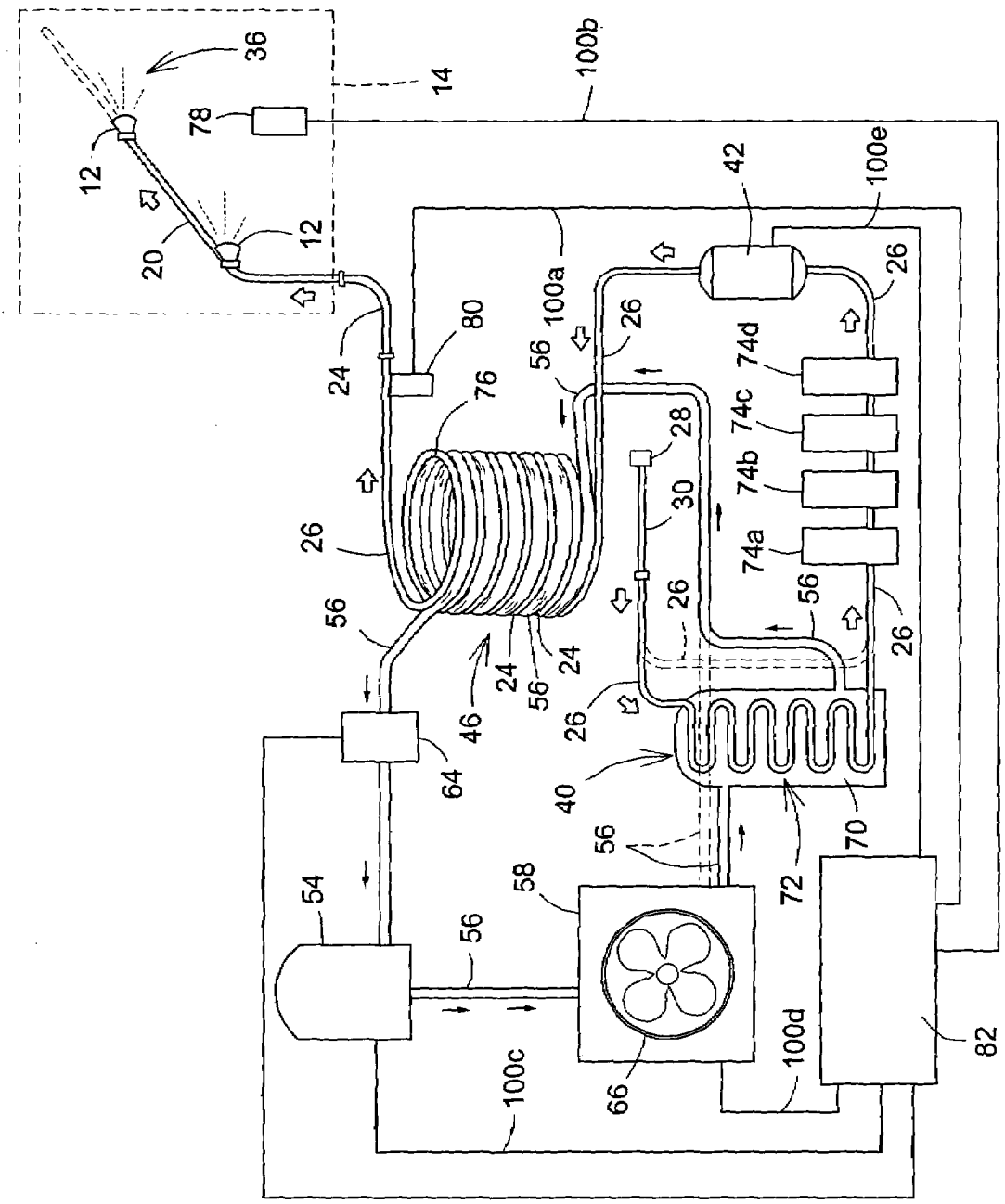

Referring now to FIGS. 1, 2, and 3, broadly speaking, system 10 provides high-pressure refrigerated water for evaporative cooling of livestock enclosure 14 by pumping water from water source 28 at high water pressure, thereby transforming water into high-pressure water having high water pressure, through water transport line 26 and refrigerating the high-pressure water to a pre-determined target water temperature. Target water temperature corresponds to a heat absorption capacity required by the high-pressure water to absorb a target heat which must be absorbed by high-pressure water, once converted into a fine mist, shown generally as 36, of water droplets 38 by misting nozzles 12 situated in enclosure 14, to cool livestock enclosure 14 to a target enclosure temperature within a target enclosure temperature range by evaporation of the water droplets 38 at target water temperature therein. Specifically, relatively low-pressure water having relatively low water pressure is initially received by system 10 in water transport line 26 from water input line 30 connected to water source 28. The water may also, optionally, circulate in water transport line 26 through optional pre-pumping heat exchanger, shown generally as 40, where water undergoes an optional pre-pumping partial refrigeration in which water is at least partially refrigerated towards target water temperature, thereby being converted into partially refrigerated water prior to entering pump 42. Regardless of whether water undergoes pre-pumping partial refrigeration in pre-pumping heat exchanger 40 or not, water then enters pump 42, through water transport line 26, and is pumped within pump 42 into high-pressure water. High-pressure water then exits pump 42, in water transport line 26, as high-pressure water at high water pressure. Water transport line 26 containing high-pressure water subsequently passes through post-pumping heat exchanger, shown generally as 46, where the high-pressure water is refrigerated in water transport line 26 to target water temperature, thereby being converted into high-pressure refrigerated water having target water temperature. The high-pressure refrigerated water at target water temperature exits post-pumping heat exchanger 46 in water transport line 26 and then circulates, via water output line 24 to manifold 20 and misting nozzles 12 disposed on manifold 20 and situated in enclosure 14. Each misting nozzle 12 is adapted to convert high-pressure refrigerated water into mist 36 of refrigerated water droplets 38 at target water temperature for evaporation in livestock enclosure 14 by absorbing heat therefrom to cool livestock enclosure 14 to a pre-determined target enclosure temperature in a pre-determined target enclosure temperature range.

For purposes of example, livestock 16 is shown in FIG. 1 as poultry, more specifically chickens 18. As mentioned previously, when livestock enclosure 14 contains chickens 18, the target enclosure temperature range is inclusively between 79 degrees Fahrenheit (79° F.) and 89° F. The specific target enclosure temperature, for purposes of example, is the minimum temperature of the target enclosure temperature range for chickens, namely 79° F. As also mentioned previously, to maintain enclosure temperature of livestock enclosure 14 within this target enclosure temperature range of 79° F. to 89° F., high-pressure refrigerated water must be received at misting nozzles 12 at a temperature below 40° F. Thus, system 10 will be described, for exemplary purposes only, in a configuration designed to refrigerate water pumped to high water pressure, i.e. high-pressure water, to a target water temperature of 34.7° F., or 1.5 degrees Celsius (1.5° C.). It should be noted that the target water temperature could be both higher or lower than 34.7° F. provided it is above the water freezing point of 32° F. and below 40° F. When livestock enclosure 14 for chickens 18 is approximately 20 feet by 80 feet in area, the target enclosure temperature of 79° F. can be reached by pumping water with system 10 into high-pressure refrigerated water having a water pressure between 1200 and 1500 pounds per square inch (PSI) and cooled to 34.7° F. to misting nozzles 12 spaced five feet apart from each other. Each misting nozzle 12 has a misting aperture, not shown, of approximately two (2) microns (micro-inch) in diameter for converting the high-pressure refrigerated water to fine mist 36. In such a configuration, generally 2.5 to 2.8 U.S. gallons of water are consumed by each misting nozzle 12 per minute.

As water transport line 26, and system 10, are releasably connected to water source 28 and misting nozzles 12, system 10 may be disconnected therefrom when not required and connected, in the same fashion as shown in FIG. 1, to a different livestock enclosure 14. Heat exchangers 40, 46, water transport line 26, pump 42, compressor 54, refrigerant line 56, and condenser 58 are mounted upon movable platform 48. Movable platform 48 is mounted on wheels 50 and has handle 52, attachable to a towing vehicle, not shown, to facilitate displacement, i.e. movement, of system 10 from one livestock enclosure 14 to another.

Referring now specifically to FIGS. 1 and 3, the pumping and refrigeration of water from water source 28 into high-pressure refrigerated water at target temperature will now be explained. To effect refrigeration of water into refrigerated water, system 10 uses a refrigerant, for example Freon or R-22, which circulates throughout system 10 in refrigerant line 56. Refrigerant line 56 forms a refrigerant circuit running between, in order of progression through the circuit shown with solid arrows, compressor 54, condenser 58, optional pre-pumping heat exchanger 40 when deployed in system 10, post-pumping heat exchanger 46, and refrigerant accumulator 64. Thus, compressor 54, condenser 58, optional pre-pumping heat exchanger 40, when deployed, post-pumping heat exchanger 46, and refrigerant accumulator 64 are operatively connected by refrigerant line 56.

Refrigerant is received as low-pressure refrigerant vapor having low refrigerant pressure from refrigerant line 56 by compressor 54 and compressed therein into compressed refrigerant in the form of hot, i.e. high temperature, high-pressure refrigerant vapor having high refrigerant pressure. The compressed refrigerant, in the form of hot, high-pressure refrigerant vapor, then circulates through refrigerant line 56 to condenser 58 where it is condensed, by absorption of heat therefrom, into a high-pressure refrigerant liquid having a high refrigerant pressure of, for example, approximately, 250-280 PSI. Condenser 58 may be an air-cooled condenser 58, a shown in FIGS. 2 and 3, which uses air fanned by ventilator fan 66 to absorb heat from the hot high-pressure refrigerant vapor, or any other type of condenser commonly used for refrigeration such as, for example, a water-cooled condenser or glycol-cooled condenser. It is not the intention of the inventor to limit the scope of the invention to embodiments deploying an air-cooled condenser 58 as shown in the Figures.

Referring to FIGS. 2 and 3, refrigerant next circulates, as high-pressure refrigerant liquid, through refrigerant line 56 from condenser 58 to optional pre-pumping heat exchanger 40, if deployed, where an optional pre-pumping refrigeration of the water is conducted. Optional pre-pumping heat exchanger 40, when present, is disposed upon water transport line 26, i.e. with water transport line 26 passing therethrough, between water input line 30 releasably connected to water source 28 and pump 42. Accordingly, when optional pre-pumping heat exchanger 40 is deployed, water from water source 28 initially enters system 10, possibly as low-pressure water at room temperature, i.e. approximately 65° F., through water input line 30 and circulates in water transport line 26, drawn by suction of pump 42, through pre-pumping heat exchanger 12 prior to arriving at pump 42. Thus, pump 42 is situated downstream on water transport line 26 from pre-pumping heat exchanger 40. When water passes through pre-pumping heat exchanger 40, it undergoes a pre-pumping refrigeration wherein the refrigerant liquid absorbs a pre-pumping portion of the target heat which must be ultimately absorbed from the water, when ultimately pumped into high-pressure water having high water pressure by pump 42, to refrigerate high-pressure water to target water temperature. As the refrigerant liquid absorbs this pre-pumping portion of target heat, refrigerant liquid is heated and at least partially evaporated into an intermediate-pressure refrigerant vapor at intermediate refrigerant pressure, for example 55 PSI, that is lower than pressure of high-pressure refrigerant vapor output from compressor 54 but higher than the low-pressure refrigerant vapor initially received by compressor 54 at low refrigerant pressure prior to compression therein.

As shown in FIGS. 2 and 3, optional pre-pumping heat exchanger 40 is a plate heat exchanger 40 having at least one heat transfer plate 70 to which refrigerant line 56 is connected and through which refrigerant passes. Water transport line 26 is disposed in contacting engagement with plate 70 on a substantial portion, both lengthwise and widthwise, of the surface area of plate 70, such as in a zig-zag pattern, for example, shown generally as 72 in FIG. 3. Thus a substantial portion of surface area of the plate 70 absorbs pre-pumping portion of the target heat from water in water transport line 26 and transfers the heat, i.e. the pre-pumping portion, to refrigerant liquid. The use of a substantial portion of the surface area of plate 70 facilitates rapid exchange, i.e. absorption, of pre-pumping portion through plate 70 to refrigerant. Accordingly, water can be refrigerated towards very rapidly during pre-pumping refrigeration with plate heat exchanger 40 from a relatively high water temperature above standard room temperature, i.e. 65° F. to the target water temperature, for example 34.7° F., for the high-pressure water or rapidly partially refrigerated toward the target water temperature. Water may also be refrigerated in pre-pumping heat exchanger 40 to a water temperature below water temperature provided, of course, water does not freeze. Advantageously, pre-pumping refrigeration of water in pre-pumping heat exchanger 40 to remove pre-pumping portion of target heat reduces refrigeration requirements for post-pumping heat exchanger 46 by reducing the remaining post-pumping portion of target heat that must be absorbed from high-pressure water therein to refrigerate high-pressure water into high-pressure refrigerated water having target water temperature. Accordingly, the greater the amount of the target heat absorbed as pre-pumping portion during pre-pumping refrigeration, the more rapidly and easily high-pressure water may be refrigerated in post-pumping heat exchanger 46 into high-pressure refrigerated water having target water temperature. In the embodiment, water is preferably, but not necessarily, completely to target water temperature during pre-pumping refrigeration in pre-pumping heat exchanger 40. Accordingly, the remaining post-pumping portion of target heat to be absorbed in post-pumping heat exchanger 46 is substantially limited to heat absorbed by water when circulating through water pump 42 during pumping of water thereby into high-pressure water.

It will be apparent to one skilled in the art that other types of heat exchangers other than plate heat exchanger 40 may be deployed as optional pre-pumping heat exchanger 40. Any heat exchanger capable of providing absorption of pre-pumping portion of target heat while permitting, when combined with post-pumping heat exchanger 46, sufficient flow of water through system 10 to provide sufficient quantities of high-pressure refrigerated water at target water temperature to misting nozzles 12 for cooling of livestock enclosure 14 may be deployed as optional pre-pumping heat exchanger 40. For example, for the livestock enclosure 14 for chickens 18 described herein, flow of water through system 10 must be sufficient to provide approximately 2.5 U.S. gallons per minute of high-pressure refrigerated water at target water temperature to each nozzle 12. Obviously, water flow requirements will change based on, among other factors, the size of livestock enclosure 14, the type of animal contained therein as livestock 16 and target temperature range required therefore, and the target water temperature. It is not the intention of the inventor to limit the scope of the invention to deployment of the specific plate heat exchanger 40 described herein as optional pre-pumping heat exchanger 40.

Referring again to FIG. 3, once optional pre-pumping refrigeration in optional pre-pumping heat exchanger 40 is completed, water circulates through water transport line 26 through at least one particle filter 74 for removing particles therefrom. Specifically, as shown in FIG. 3, water passes progressively through particle filters 74a, 74b, 74c, and 74d. Particle filters 74a, 74b, 74c, and 74d are adapted to capture progressively smaller particles, with Particle filter 74a capturing the largest particles and particle filter 74d capturing the smallest particles. While a greater or smaller number of particle filters 74 may be deployed, at least one particle filter 74 must be deployed that is capable of capturing all particles that might obstruct nozzle apertures to avoid blockage of nozzles 12 by particles. After water is filtered in particle filters 74, water circulates to pump 42 where it is pumped to high water pressure, possibly absorbing additional heat during pumping, and becomes high-pressure water. High-pressure water exits pump 42 and circulates to post-pumping heat exchanger 46 for post-pumping refrigeration. It should be noted that particle filters 74 may also be deployed between pump 42 and post-pumping heat exchanger 46 or between post-pumping heat exchanger 46 and nozzle 12. However, since excessive and/or large particles may also damage pump 42, system 10 must include some means, whether particle filters 74 or not, to ensure that pump 42 is not obstructed or damaged by particles.

Referring still to FIG. 3, after pumping in pump 42, high-pressure water circulates through water transport line 26 through post-pumping heat exchanger 46. If pre-pumping heat exchanger 40 is present in system, then a pre-pumping portion of the target heat that must be removed from high-pressure water to refrigerate high-pressure water to target temperature will have already been removed during pre-pumping refrigeration in pre-pumping heat exchanger 40. Similarly, refrigerant, having already been at least partially evaporated in evaporated in pre-pumping heat exchanger 40 will be intermediate-pressure refrigerant vapor at intermediate refrigerant pressure, thus retaining some heat absorption capability. As high-pressure water circulates through post-pumping heat exchanger 46, intermediate-pressure refrigerant vapor absorbs the remaining post-pumping portion, including any additional heat absorbed by water during pumping in pump 42, of target heat not already absorbed in pre-pumping heat exchanger and is converted into low-pressure refrigerant vapor. As the remaining post-pumping portion is absorbed, high-pressure water is refrigerated into high-pressure refrigerated water having target temperature. High-pressure refrigerated water then circulates through water transport line 26 to water output line 24 and then through manifold 20 to misting nozzles 12. After absorption of remainder portion of target heat, low-pressure refrigerant vapor circulates in refrigerant line 56 through refrigerant accumulator 64 and then to compressor 54 where it can again be compressed into high-pressure refrigerant vapor. Refrigerant accumulator 64 captures and accumulates any unevaporated portion of high-pressure refrigerant liquid that is not evaporated in post-pumping heat exchanger 46 to ensure that the unevaporated portion, which may damage compressor 54, does not circulate to compressor 54. Refrigerant accumulator 64 may also, alternatively, be situated on refrigerant line 56 within the post-pumping heat exchanger 46.

Advantageously, since post-pumping refrigeration in post-pumping heat exchanger 46 takes place after high-pressure water has passed through pump 42, any additional heat absorbed by high-pressure water during pumping thereof by pump 42 is absorbed by refrigerant in post-pumping heat exchanger 46. Thus, the problem of absorption of additional heat by water during pumping, which may cause high-pressure water to arrive at nozzles 12 at a temperature above target water temperature is circumvented. Further, since pre-pumping portion of target heat has already been removed when pre-pumping heat exchanger 40 is present, heat absorption required in post-pumping heat exchanger 46 to refrigerate high temperature water to target water temperature, i.e. into high-pressure refrigerated water, is reduced, thus permitting rapid refrigeration of high-pressure water into high-pressure refrigerated water at target water temperature with a relatively low capacity post-pumping heat exchanger 46, compared to pre-pumping heat exchanger 40. The reduced heat absorption required from post-pumping heat exchanger 46 when pre-pumping heat exchanger 40 is present also, usefully, permits use of refrigerant in the form of intermediate-pressure refrigerant vapor at intermediate refrigerant pressure to complete refrigeration of high-pressure water into high-pressure refrigerated water at target water temperature by limiting absorption to remaining post-pumping portion of the target heat.

Post-pumping heat exchanger is, as shown in FIGS. 2 and 3, a tubular heat exchanger 46 in which refrigerant line 56 and water transport line 26 are disposed, i.e. wound, in contacting engagement with each other top form a coil 76. Winding of refrigerant line 56 and water transport line 56 into coil 76 allows contacting engagement between relatively long portions of refrigerant line 56 and water transport line 26 in a relatively small space and permits high-pressure water and refrigerant, either as refrigerant vapor or refrigerant liquid, to pass quickly therethrough for rapid refrigeration to target water temperature.

Should optional pre-pumping heat exchanger 40 not be deployed in system 10, refrigerant line 56 will extend through then potion thereof shown in dotted lines, directly from condenser 58 through to post-pumping heat exchanger 46. Accordingly, high-pressure refrigerant liquid will circulate directly from condenser 58 to post-pumping heat exchanger 46. Similarly, water will circulate directly from water input line 28 through a water transport line 26, via a portion thereof shown in dotted lines, to particle filters 72 and then to pump 42 for pumping thereby into high-pressure water. In post-pumping heat exchanger 46, high-pressure refrigerant liquid will be evaporated into low-pressure refrigerant vapor during post-pumping refrigeration by absorbing all of target heat from high-pressure water, including all heat absorbed thereby when passing through pump 42, thus refrigerating high-pressure water into high-pressure refrigerated water having target water temperature. Accordingly, as when optional pre-pumping heat exchanger 40 is deployed, any additional heat absorbed by high-pressure water during pumping thereof by pump is absorbed by refrigerant, as refrigerant liquid when pre-pumping heat exchanger 40 is absent, in post-pumping heat exchanger 46. The problem of absorption of additional heat by water during pumping, which may cause high-pressure water to arrive at nozzles 12 at a temperature above target water temperature is therefore advantageously circumvented. As the amount of refrigeration to be undertaken by post-pumping heat exchanger 46 will be much greater when pre-pumping heat exchanger 40 is not deployed, post-pumping heat exchanger 46 will have to have a substantially greater refrigeration capacity than when pre-pumping heat exchanger 40 is deployed. For example, a tubular heat exchanger 46 having a larger coil 76, thereby allowing more heat absorption, could be deployed as post-pumping heat exchanger 46.

It should be noted that, regardless of the presence of pre-pumping heat exchanger 40, that heat exchangers other than tubular heat exchanger 46 may be deployed as post-pumping heat exchanger 46. In general, any heat exchanger capable of refrigerating the flow of water required by misting nozzles 12 from water temperature thereof after passage through pump 42 to target water temperature may be deployed as post-pumping heat exchanger 46. For the livestock enclosure 14 for chickens 18 specifically described herein, flow of water through system 10 must be sufficient to provide approximately 2.5 gallons per minute of high-pressure refrigerated water at target water temperature to each nozzle 12. Obviously, water flow requirements will change based on, among other factors, the size of livestock enclosure 14, the type of animal contained therein as livestock 16 and target temperature range required therefore, and the target water temperature. It is not the intention of the inventor to limit the scope of the invention to deployment of the specific tubular heat exchanger 46 described herein as pre-pumping heat exchanger 46.

To better ensure that livestock enclosure temperature remains within the target enclosure temperature range and that high-pressure water supplied to nozzles 12 is, in fact, at high-pressure water refrigerated to target water temperature, control unit 82 of system 10 is operatively connected by control line 100*a* to water temperature sensor 80 and releasably operatively connected to enclosure temperature sensor 78 by control line 100*b*. Control unit 82 is further connected by control lines 100*c*, 100*d*, 100*e* to, respectively, compressor 54, condenser 58, and pump 42, and controls operation thereof. For example, compressor 54, condenser 58, and pump 42 may be actuated or deactuated by control unit 82 using control lines 100. The means or method by which control unit 82 actuates or deactuates compressor 54, condenser 58, and pump 42 through control lines 100 may be any typical method or means used for control of electrical or mechanical systems, such as, for example, transmission of actuation or deactuation signals over control lines 100 or use of relays to enable or disable energy flow to compressor 54, condenser 58, and pump 42. Similarly, control unit 82 may receive signals regarding temperatures detected by sensors 80, 78 through control lines 100*a*, 100*b* by any means or method by which such signals are typically transmitted and received in electrical or mechanical systems.

Water temperature sensor 80 is situated between post-pumping heat exchanger 46 and nozzle 12 for sensing and verifying water temperature of high-pressure refrigerated water, i.e. the temperature of high-pressure water after it has passed through post-pumping heat exchanger 46. Thus, water temperature sensor 80 may be disposed on water transport line 26, water output line 24, or within misting nozzle 12 provided that water temperature sensor 80 is situated to sense the water temperature after post-pumping refrigeration in post-pumping heat exchanger 46. Water temperature sensor 80 sends information, i.e. signals, regarding water temperature sensed thereby to control unit via control line 100*a*. Should water temperature sensed by water temperature sensor 80 be below target water temperature, control unit 82 deactuates compressor 54 until such time as water temperature sensed by water temperature sensor 80 rises to target water temperature or slightly thereabove. Deactuation of compressor 54 terminates compression of refrigerant and, therefore, dramatically reduces refrigeration capacity thereof. In turn, refrigeration of water in post-pumping and pre-pumping heat exchangers 40, 46 is also reduced, thus allowing water temperature of high-pressure water output from post-pumping refrigerator 46 to rise to target water temperature, or slightly thereabove before compressor is again actuated to recommence refrigeration of high-pressure water output by pump 42 to target water temperature. Deactuation of compressor 14 in this fashion prevents high-pressure water, often near freezing point, from freezing in water transport line 26 and water output line 24 and helps to guard against excessive cooling of livestock enclosure 14.

Enclosure temperature sensor 78 is disposed, i.e. situated, in livestock enclosure 14, senses enclosure temperature thereof, and sends information, i.e. signals, regarding the enclosure temperature sensed thereby to control unit 82. Should the enclosure temperature of livestock enclosure 14 sensed by enclosure temperature sensor 78 fall below target enclosure temperature, control unit 82 will deactuate compressor 54 and pump 42, thus terminating flow of water to nozzles 12, until enclosure temperature sensed by enclosure temperature rises to target enclosure temperature or slightly thereabove.

It will be apparent to one skilled in the art that, should system 10 be used for livestock enclosure 14 having livestock 16 other than chickens 18, target enclosure temperature range and target enclosure temperature will be different. Target water temperature may also be different. System 10, however, can be adapted to such different temperature requirements by changing the amount of refrigeration applied in post-pumping heat exchanger 46 and optional pre-pumping heat exchanger 40 to modify target water temperature and/or by changing the amount of high-pressure refrigerated water at target water temperature distributed as mist 36, i.e. water droplets 38, in livestock enclosure 14. Different spacing of misting nozzles 12 and size of nozzle apertures, as well as different water pressures can also be deployed for adaptation of system 10 for use in livestock enclosures 14 for housing livestock 16 other than chickens 18 or for adapting system 10 for use with livestock enclosures 14 having different dimensions than those described herein. In addition, enclosure temperature sensor 78 can be modified to detect when enclosure temperature descends below the modified target enclosure temperature within the target enclosure temperature range for the type of livestock concerned and to actuate and deactuate the compressor 54 and pump 42 accordingly. In addition, system 10 could be configured to be in a default deactuated state and only actuated when enclosure temperature sensed by enclosure temperature sensor 78 rises to a target enclosure temperature at the upper end of target enclosure temperature range. Water temperature sensor 80 may also be similarly modified with regard to target water temperature. It is not the intention of the inventor to limit the scope of the invention to use for livestock enclosures 14 containing only chickens 18 or to any of the specific misting nozzle configurations, size of livestock enclosure 14, specific pressure levels for water pressure or refrigerant pressure, target water temperatures, target enclosure temperatures, target enclosure temperature ranges, or sensor configurations described specifically herein.

While a specific embodiment has been described, those skilled in the art will recognize many alterations that could be made within the spirit of the invention, which is defined solely according to the following claims. The description herein is provided for purposes of illustration and not limitation.

I claim:

1. A refrigerated water pumping system for pumping water from a water source through a water transport line of said system operatively connected to the water source to at least one misting nozzle disposed within an enclosure, said system comprising:

a compressor for compressing a refrigerant received from a refrigerant line connected thereto;

a condenser operatively connected to said compressor by said refrigerant line for condensing said refrigerant after said compressing;

a pump disposed on the water transport line for pumping said water at high water pressure therethrough, thereby converting the water into a high-pressure water;

a post-pumping heat exchanger operatively connected to the water transport line between said pump and the misting nozzle and to said refrigerant line between said condenser and said compressor for receiving said refrigerant from said condenser, said refrigerant absorbing heat from said high-pressure water in said post-pumping heat exchanger for refrigerating said high-pressure water into a high-pressure refrigerated water; and a pre-pumping heat exchanger operatively connected to the water transport line between the water source and the pump and to said refrigerant line between said condenser and said post-pumping heat exchanger, wherein said refrigerant is compressed in said compressor into a high-pressure refrigerant vapor and said condenser condenses said refrigerant from said high-pressure refrigerant vapor into a high pressure refrigerant liquid, said pre-pumping heat exchanger receives said water from said water source and said high pressure refrigerant liquid from said condenser for refrigerating said water into partially refrigerated water by absorption of heat therein by said high-pressure refrigerant liquid, thereby at least partially evaporating said high-pressure refrigerant liquid into intermediate-pressure refrigerant vapor for circulation in said refrigerant line to said post-pumping heat exchanger from, said partially refrigerated water being pumped by said pump into high-pressure refrigerated water to said post-pumping heat exchanger for refrigeration therein into said high-pressure refrigerated water by absorption of heat by said intermediate-pressure refrigerant vapor.

2. The system of claim 1, wherein said system further comprises a system controller for controlling operation of said compressor and said pump.

3. The system of claim 1, wherein said refrigerant is compressed in said compressor into a high-pressure refrigerant vapor and said condenser condenses said refrigerant from said high-pressure refrigerant vapor into a high pressure refrigerant liquid, said high pressure refrigerant liquid absorbing said heat in said post-pumping heat exchanger.

4. The system of claim 3, wherein said post-pumping heat exchanger is a tubular heat exchanger through which the water transport line and said refrigerant line pass in contacting engagement with each other, said contacting engagement enabling absorption of said heat from said high-pressure water through the water transport line and said refrigerant line by said high-pressure refrigerant liquid in said post-pumping heat exchanger.

5. The system of claim 1, further comprising a refrigerant accumulator connected to said compressor and said post-pumping heat exchanger by said refrigerant line, wherein said refrigerant is at least partially evaporated by said absorption of said heat into low-pressure refrigerant vapor for circulation from said post-pumping heat exchanger through said refrigerant line and said refrigerant accumulator to said compressor, said refrigerant accumulator receiving and accumulating an unevaporated portion of said refrigerant from said post-pumping heat exchanger as refrigerant liquid for impeding flow of said unevaporated portion to said compressor.

6. The system of claim 1, further comprising at least one particle filter disposed on the water transport line for removing particles from the water.

7. The system of claim 1, further comprising a movable platform upon which said compressor, said condenser, said post-pumping heat exchanger, the water transport line and said refrigerant line are mounted, for displacement of said system.

8. The system of claim 1, wherein said pump is adapted for pumping the water as said high-pressure refrigerated water through a nozzle aperture of the misting nozzle, said nozzle aperture having a diameter of about 2 microns for converting said high-pressure refrigerated water into a mist of refrigerated water droplets.

9. The system of claim 1, wherein said condenser is a refrigerant-to-air condenser wherein cooled air circulating therein absorbs refrigerant heat from said refrigerant, condensing said refrigerant.

10. The system of claim 1, wherein said heat exchanger refrigerates said high-pressure water to a predetermined target water temperature varying between about 79 degrees Fahrenheit and about 89 degrees Fahrenheit.

11. The system of claim 2, further comprising a water temperature sensor operatively connected to said system controller and to the water transport line between said misting nozzle and said post-pumping heat exchanger for sensing water temperature of said high-pressure refrigerated water, said controller deactuating said compressor when said water temperature sensed by said water temperature sensor is below a predetermined target water temperature.

12. The system of claim 2, wherein said system controller is releasably operatively connectable to an enclosure temperature sensor disposed within said enclosure for sensing an enclosure temperature thereof, said system controller deactuating said compressor and said pump when said enclosure temperature sensor senses that said enclosure temperature is below a predetermined target enclosure temperature.

13. The system of claim 4, wherein the water transport line and said refrigerant line are wound in said contacting engagement within said tubular heat exchanger to form a coil within said tubular heat exchanger.

14. The system of claim 6, wherein said at least one particle filter is disposed between the water source and said pump to remove said particles before the water circulates to said pump, thereby preventing said particles from entering said pump.

15. The system of claim 10, wherein said target water temperature is about 34.7 degrees Fahrenheit.

16. The system of claim 11, wherein said target enclosure temperature is about 79 degrees Fahrenheit.

17. The system of claim 8, wherein said high-pressure refrigerated water is pumped to a high water pressure level of at least about 1200 pounds per square inch and at most about 1500 pounds per square inch.

18. The system of claim 1, wherein said pre-pumping heat exchanger comprises a plate heat exchanger having at least one heat transfer plate connected to said refrigerant line for circulation of said liquid refrigerant therethrough and upon which said water transport line is disposed in contacting engagement therewith, said heat transfer plate absorbing heat from the water in the water transport line for transfer thereof to said high-pressure refrigerant liquid, thereby at least partially evaporating said high-pressure refrigerant liquid into said intermediate-pressure refrigerant vapor.

* * * * *